United States Patent
Otis et al.

(10) Patent No.: US 9,942,724 B2
(45) Date of Patent: Apr. 10, 2018

(54) METHOD AND SYSTEM FOR AUTOMATICALLY DEVELOPING A CONTENT-BASED FLOOR MAP

(71) Applicant: Target Brands, Inc., Minneapolis, MN (US)

(72) Inventors: Collin Otis, Turtle Creek, PA (US); Joshua Barrett Strausser, Turtle Creek, PA (US)

(73) Assignee: Target Brands, Inc., Minneapolis, MN (US)

(*) Notice: Subject to any disclaimer, the term of this patent is extended or adjusted under 35 U.S.C. 154(b) by 0 days.

(21) Appl. No.: 15/473,219

(22) Filed: Mar. 29, 2017

(65) Prior Publication Data

US 2017/0272917 A1  Sep. 21, 2017

Related U.S. Application Data

(63) Continuation of application No. 14/750,501, filed on Jun. 25, 2015, now Pat. No. 9,622,046.

(60) Provisional application No. 62/017,032, filed on Jun. 25, 2014.

(51) Int. Cl.
 *H04W 4/04* (2009.01)
 *H04W 40/24* (2009.01)
 *H04W 4/02* (2018.01)
 *H04W 24/02* (2009.01)

(52) U.S. Cl.
 CPC .......... *H04W 4/043* (2013.01); *H04W 40/244* (2013.01)

(58) Field of Classification Search
 CPC ....... H04W 4/04; H04W 4/021; H04W 4/028; H04W 24/10; H04W 4/043; H04W 40/244; H04W 4/003; G06Q 30/0261; G06Q 30/0267
 USPC ............... 455/419, 452.1, 418, 456.1, 456.2; 701/434, 516; 370/252, 312, 328; 705/14.53, 14.58
 See application file for complete search history.

(56) References Cited

U.S. PATENT DOCUMENTS

| | | | |
|---|---|---|---|
| 8,050,984 B2 | 11/2011 | Bonner et al. | |
| 2009/0286548 A1* | 11/2009 | Coronel | H04W 4/20 455/456.1 |
| 2013/0103608 A1 | 4/2013 | Scipioni et al. | |
| 2014/0279014 A1 | 9/2014 | Roka et al. | |
| 2015/0054620 A1 | 2/2015 | Graube et al. | |

OTHER PUBLICATIONS

U.S. Appl. No. 14/750,501, filed Jun. 25, 2015 by Collin Otis et al.
(Continued)

*Primary Examiner* — Inder Mehra
(74) *Attorney, Agent, or Firm* — Shumaker & Sieffert, P.A.

(57) ABSTRACT

A system creates a content-based mapping of a physical space based on data received from beacons positioned at various locations in a physical space. Each beacon transmits a unique beacon identifier. When a mobile device detects a beacon identifier, the mobile device may also detect the signal strength of the transmitted identifier. If, with or shortly after detecting the beacon identifier, the mobile device is used to view content that is present in the physical space, the system may use the content information, the beacon identifier and the signal strength to build content-based floor map of the physical space.

20 Claims, 8 Drawing Sheets

(56) References Cited

OTHER PUBLICATIONS

Prosecution History from U.S. Appl. No. 14/750,501, dated Oct. 6, 2016 through Jan. 17, 2017, 34 pp.
U.S. Appl. No. 14/750,468, filed Jun. 25, 2015 by Collin Otis et al.

* cited by examiner

METHOD AND SYSTEM FOR AUTOMATICALLY DEVELOPING A CONTENT-BASED FLOOR MAP

This application is a continuation of U.S. patent application Ser. No. 14/750,501, filed Jun. 25, 2015, which claims the benefit of U.S. Provisional Patent Application 62/017,032, filed Jun. 25, 2014, the entire content of which is incorporated herein by reference.

BACKGROUND

To continue to engage consumers who visit commercial properties, many property operators often change the property's layout in order to keep the consumer experience exciting and fresh. For example, retail stores often rotate various products in and out of inventory, such as may happen when a seller of clothing rotates styles and seasonal clothing in and out based on current consumer tastes. A grocery store may move certain products to an end cap of an aisle for promotional purposes for a limited period of time. Other commercial properties change their layout by necessity. For example, the layout of a convention facility or conference center may change depending on the particular event that the property is hosting at the time.

Commercial property owners and operators, as well as the manufacturers of products sold in those properties, present many marketing and product information messages to consumers within the property. The messages may be in the form of signs, audio messages, video screens, and location-based digital messaging on mobile devices. However, these messages require manual labor and scheduling to change as the property's layout and content changes.

Some property owners and operators do not keep digital records of the property layout, keep only paper records, or do not keep records at all. In order to allow location-based digital messaging, digital property layouts are often required. Creating, maintaining, and updating such records for a single location can become cumbersome; maintaining hundreds or thousands of property locations can be overwhelming or prohibitive.

SUMMARY

In some examples, a system for creating a content-based map of a physical space employs a set of beacons positioned at various locations in the physical space. Each beacon includes a transmitter that transmits a unique beacon identifier. A mobile device uses one or more software applications to perform information collection functions about the physical space. The information collection functions may include detecting one or more unique beacon identifiers transmitted from one or more of the beacons; determining a signal strength for each detected unique beacon identifier; and, substantially concurrently with the detecting, identifying that an application of the mobile device is being used to access content that corresponds to one or more items that are present in the physical space. The device may send the detected signal strengths, unique beacon identifiers, and an identifier for the accessed content to a server for use in building a content-based map of the physical space. The device may do this by sending the collected data, or by sending a function of the data such as a vector representation. The detecting, determining, identifying and sending may be repeated after the mobile device has moved to a different location in the physical space. The remote server may use the received data to create a floor map of the physical space by mapping a signal space representation of the physical space to items located in the physical space.

Optionally, the process of identifying content corresponding to one or more products present in the physical space may include determining the mobile device is running an application associated with an operator of the physical space, such as a retailer's native mobile application. If so, the application may identify a product identifier relating to a product that was being presented by the application substantially concurrently with the detecting, and the application and/or server may retrieve a content identifier associated with the product identifier.

Alternatively, the process of identifying content corresponding to one or more products present in the physical space may include determining mobile device is using a browsing application to access a website associated with an operator of the physical space. If so, the system may receive an identifier for a page of the website that was being presented by the application substantially concurrently with the detecting, and the system may retrieve a content identifier associated with the page.

Alternatively, the system may receive a barcode captured by a barcode scanning application or an image captured by a camera application of the device. The barcode may be associated with a product available in the physical space, while the image (if captured) may be of the product. The application or server may process this information and retrieve either a content identifier associated with the barcode, or content recognized in the image such as that which may be identified by image recognition technologies.

Optionally, when a mobile device sends the detected signal strengths and unique beacon identifiers, the mobile device may send the beacon identifier for the beacon having the highest detected signal strength out of all detected signal strengths at a point in time. If so, the instructions that cause the server to create the floor map of the physical space may include instructions to: (i) transform a group of tuples, wherein each tuple comprising a beacon identifier and associated content identifier, into one or more vectors; (ii) map the vectors to a signal space representation of the physical space; (iii) receive additional tuples and update the additional tuples to additional vectors; and (iv) create an updated signal space representation of the physical space using the additional vectors and without using one or more older vectors. Optionally, the instructions to map the vectors to a signal space representation of the physical space may include instructions to create a point cloud of content, receive additional tuples and update the additional tuples to additional vectors, and create an updated signal space representation of the physical space using the additional vectors and without using one or more older vectors.

Optionally, to send the detected signal strengths and unique beacon identifiers, the device may detect a signal vector of signal strengths of any beacons within range at a point in time and send the signal vector to the server. If so, the instructions that may cause the server to create the floor map of the physical space may cause the server to map all received signal vectors to a signal space representation of the physical space.

In some examples, the system may include a data store with data associating each of the received unique beacon identifiers with a beacon location. If so, the system may use this information, and in particular the floor map and the beacon locations, to create an electronic file that, when displayed on a display of a mobile device, may display as a human-readable floor map.

In one example, this disclosure describes a method comprising: receiving, by a computing system comprising one or more computing devices, a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; receiving, by the computing system, a plurality of content identifiers, each respective content identifier of the plurality of content identifiers identifying content accessed by a mobile device of the plurality of mobile devices, the content corresponding to an item among a plurality of items located within the physical space; generating, by the computing system, a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determining, by the computing system, a content identifier having a highest number of occurrences within a predetermined radius of the location of the respective point; and transforming, by the computing system, the determined content identifier to a category identifier for the location of the respective point, the category identifier identifying a category of items in the plurality of items; partitioning, by the computing system, the physical space into a plurality of partitions, each respective partition of the plurality of partitions corresponding to a respective contiguous area within the physical space having a respective shared category identifier; and generating, by the computing system, a floor map of the physical space, the floor map including boundary contours of the partitions and including, for each respective partition of the plurality of partitions, a respective text label indicating a respective category of items identified by the respective shared category identifier of the respective contiguous area to which the respective partition corresponds.

In another example, this disclosure describes a computing system comprising: one or more communication ports configured to: receive a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; and receive a plurality of content identifiers, each respective content identifier of the plurality of content identifiers identifying content accessed by a mobile device of the plurality of mobile devices, the content corresponding to an item among a plurality of items located within the physical space; and one or more processors configured to: generate a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determine a content identifier having a highest number of occurrences within a predetermined radius of the location of the respective point; and transform the determined content identifier to a category identifier for the location of the respective point, the category identifier identifying a category of items in the plurality of items; partition the physical space into a plurality of partitions, each respective partition of the plurality of partitions corresponding to a respective contiguous area within the physical space having a respective shared category identifier; and generate a floor map of the physical space, the floor map including boundary contours of the partitions and including, for each respective partition of the plurality of partitions, a respective text label indicating a respective category of items identified by the respective shared category identifier of the respective contiguous area to which the respective partition corresponds.

In another example, this disclosure describes a non-transitory computer readable storage medium comprising instructions stored thereon that, when executed, configure a computing system to: receive a plurality of signal strength vectors, each respective signal strength vector of the plurality of signal strength vectors comprising respective indications of signal strengths, as detected by a mobile device of a plurality of mobile devices, of signals emitted by a plurality of beacons located within a physical space; and receive a plurality of content identifiers, each respective content identifier of the plurality of content identifiers identifying content accessed by a mobile device of the plurality of mobile devices, the content corresponding to an item among a plurality of items located within the physical space; generate a point cloud comprising a plurality of points, wherein each respective point of the point cloud maps a respective content identifier of the plurality of content identifiers to a respective location within the physical space corresponding to a respective signal strength vector of the plurality of signal strength vectors; for each respective point of the point cloud: determine a content identifier having a highest number of occurrences within a predetermined radius of the location of the respective point; and transform the determined content identifier to a category identifier for the location of the respective point, the category identifier identifying a category of items in the plurality of items; partition the physical space into a plurality of partitions, each respective partition of the plurality of partitions corresponding to a respective contiguous area within the physical space having a respective shared category identifier; and generate a floor map of the physical space, the floor map including boundary contours of the partitions and including, for each respective partition of the plurality of partitions, a respective text label indicating a respective category of items identified by the respective shared category identifier of the respective contiguous area to which the respective partition corresponds.

The details of one or more examples are set forth in the accompanying drawings and the description below. Other features, objects, and advantages of the disclosure will be apparent from the description, drawings, and claims.

DETAILED DESCRIPTION

Figure 1:
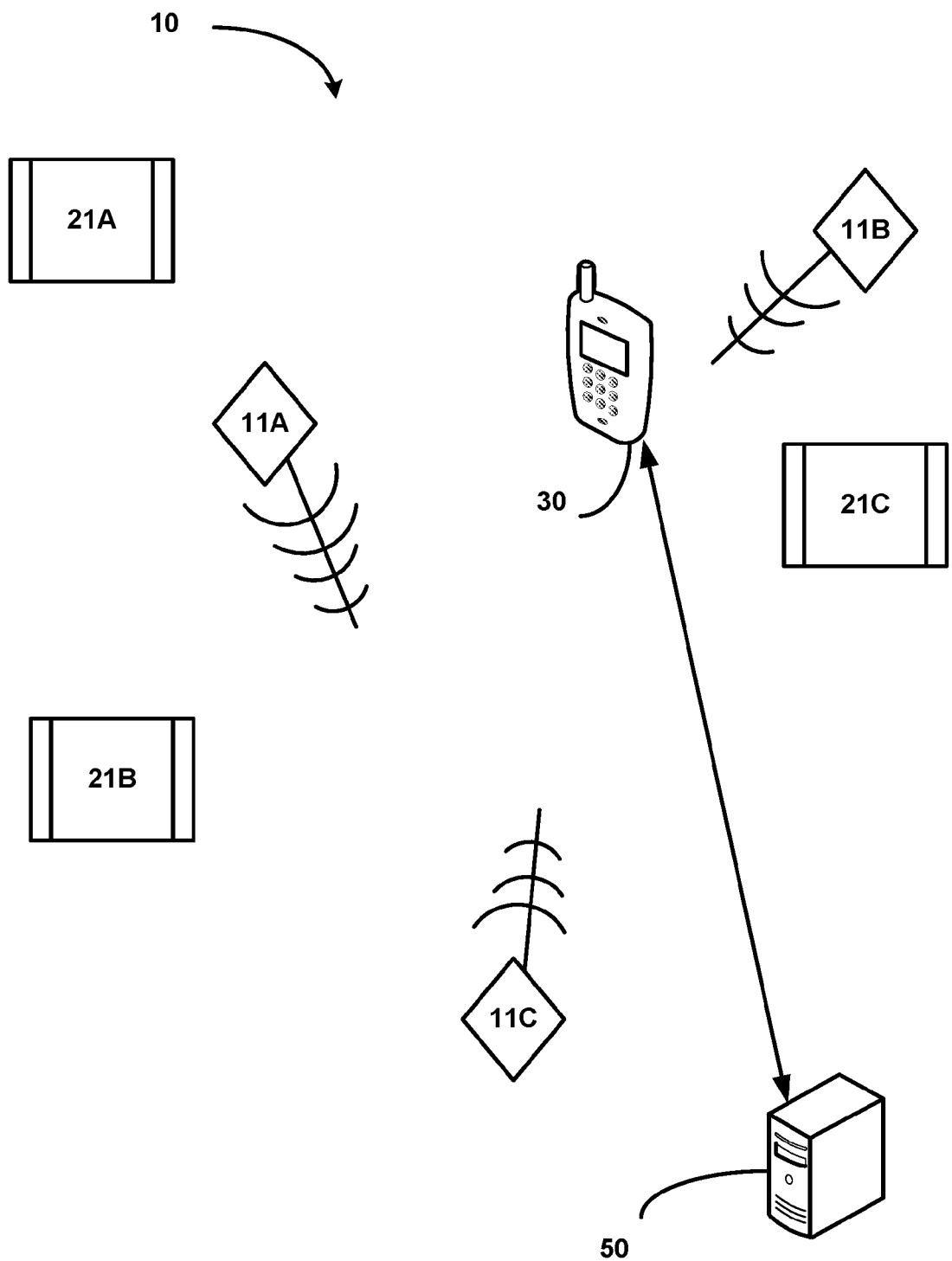
FIG. 1 illustrates an example of a physical space in which elements of a floor map development system are deployed, in accordance with a technique of this disclosure.

As used in this disclosure, the singular forms "a," "an," and "the" include plural references unless the context clearly dictates otherwise. Unless defined otherwise, all technical and scientific terms used herein have the same meanings as commonly understood by one of ordinary skill in the art. As used in this disclosure, the term "comprising" means "including, but not limited to."

The terms "mobile device" and "mobile electronic device" refer to a portable computing device that includes a display, a processor and tangible, computer-readable memory. The device also may include other hardware such as an image capturing device. The memory may contain programming instructions in the form of a software application that, when executed by the processor, causes the device to perform one or image acquisition and processing operations according to the programming instructions. Examples of mobile devices include portable electronic devices such as smartphones (i.e., "smart phones"), personal digital assistants, cameras, tablet devices, electronic readers, personal computers, media players, satellite navigation devices, and the like.

The term "beacon" refers to a device having a transmitter that emits a signal that can be detected by a mobile device, so that mobile devices can detect the presence of the beacon. The signal may contain a device identification code, data, or other information. In some examples, a beacon may use a short range communication protocol to transmit signals, and mobile devices may use the short range communication protocol to detect the signals. Examples of short range communication protocols include various Bluetooth protocols and related protocols, such as the Bluetooth Low Energy protocol, near field communication (NFC) protocols, ZigBee, ANT, ANT+, radio frequency identification (RFID) and others. Some examples of beacons also may transmit sonic communications or local area wireless signals such as Wi-Fi signals.

A beacon that uses a "low energy" communication protocol is one with characteristics of being capable of transmitting short data packets for short distances (such as up to 10 meters, up to 25 meters, or in some cases up to 100 meters or more) while consuming very little power. A low energy beacon is typically designed to operate for several years or more on a single standard battery.

The term "floor map" refers to a model of a physical space, in which the model includes data that represents locations and descriptive data for various items within the physical space. Examples include a map of a room or section of a retail store, with associated data indicating where various items are located within the room or section. The items may be specific items (such as those associated with a SKU number), general categories of items (such as men's shoes), or items denoted by any combination of general and specific characteristics. In some examples, the floor map may be a signal space representation of a physical space.

The terms "signal space" and "signal-space" refer to a coordinate system whose position vector is comprised of the signal strength of the beacons within the physical space. For instance, if there are a total of N beacons within the space, the signal-space position vector may be comprised of the measured signal strength of each of the N beacons. When given the Euclidean coordinates of each beacon, there exists a mapping from signal-space to physical three-dimensional Euclidean space.

FIG. 1 illustrates an example of a system for generating a content-based floor map, in accordance with a technique of this disclosure. In the example of FIG. 1, a physical space 10 contains various items 21A, 21B, and 21C (collectively, "items 21"), such as products that are sold in a retail store, vendors in a convention center or trade show, stores in a shopping center, activities in an amusement park or other products and settings. For example, if physical space 10 is a retail store, one group of items 21 may be men's jeans, another group of items 21 may be men's sweaters, and another group of items 21 may be women's sweaters. Other categories and numbers of items are of course possible.

Beacons 11A, 11B, 11C (collectively, "beacons 11") are disposed at various locations in physical space 10. At least three beacons are represented in the example of FIG. 1 to develop a data set, although fewer can be used, and if more are available that can make the mapping more precise and/or robust. Beacons 11 may be dispersed throughout physical space 10 so that the set of beacons is collectively proximate to a variety of items in physical space 10.

Each of beacons 11 may emit a signal containing a unique identifier (ID) for the beacon. The identifier may be an alphanumeric or other code that includes a group identifier portion and a beacon identifier portion. The group identifier portion may be common to all beacons in a group, such as all beacons in physical space 10, in a particular section of physical space 10, all beacons deployed by a particular operator in a set of areas, or another grouping. The beacon identifier portion may include a code unique to a particular beacon within the group, resulting in an overall unique identifier for each beacon.

As a user moves a mobile device 30 through physical space 10, a software application running on mobile device 30 may cause mobile device 30 to detect the emitted beacon signals within range and identify a beacon identifier and signal strength for each detected signal. Mobile device 30 may send this data or a function of this data to a server 50 configured to store this data, along with other data discussed elsewhere in this disclosure. In some examples, server 50 is positioned within physical space 10. In other examples, server 50 is a remote server with which mobile device 30 directly or indirectly communicates via one or more communication networks.

Server 50 may aggregate the stored data with data received from various mobile computing devices, such as mobile device 30, at various times within physical space 10 to develop a floor map of physical space 10. In some examples, server 50 performs this aggregation by correlating beacon IDs and signal strength data with data revealing content users of the mobile devices were viewing on the mobile devices substantially concurrently with the mobile devices' collection of the beacon ID and signal strength data. Examples of content may include: (i) the address of, or content in, one or more web pages that are being displayed on mobile device 30; (ii) an item that a native application of an operator of physical space 10 is presenting on mobile device 30; (iii) an image of an item captured by a camera application of mobile device 30; (iv) a barcode captured by a barcode scanning application of mobile device 30; (v) a search query; or (vi) other content. Example processes for capturing this content are discussed elsewhere in this disclosure.

Thus, this disclosure describes a system for automatically generating a floor map by aggregating the content that users view at various locations on Internet-enabled mobile devices. This may be referred to as "learning" the floor map. The process of using aggregated data may be considered to be a form of crowdsourcing. The system uses a network of proximity beacons to determine locations of users and tag content that the users view or otherwise access on their mobile devices when the users are near the beacons.

In some examples, beacons 11 are considered to be sensor nodes that enable mobile device 30 to develop a measure of distance from each of beacons 11. Hence, in some instances, this disclosure may refer to beacons as "sensors." A "distance" may include an actual numeric distance, a general category of distance (such as "far," "near," or "immediate"), or a combination of the two. Mobile device 30 may detect a measure of strength of any signal received from a beacon. The signal strength itself may be a measure of distance, in that the more intense the signal strength, the shorter the distance between mobile device 30 and the beacon. One example may use Bluetooth Low Energy beacons, but various examples may leverage various types of communication and/or location sensing technology. For instance, a network of proximity beacons can be replaced with any system capable of delivering discrete or continuous locations for the Discrete System (i.e., a "discrete" mode) and the Continuous System (i.e., a "continuous" mode) described below. In an alternate example, a camera of mobile device 30 captures an image of a beacon (or a camera on a beacon captures an image of mobile device 30), and a software application may process the image to determine a distance between the beacon and mobile device 30.

The term "location" is used loosely in this disclosure because it is not necessary to deal with location in the traditional Euclidian sense. For instance, location can correspond to a higher-dimensional signal-space, such as a vector of ten sensor signal strengths where each strength is proportional to distance from a given beacon instead of three components of a Cartesian position vector. The system may be used as a means to relate device location to relevant content and digital assets (products, descriptions, ads, offers, web links, etc.) that are used or access on mobile device 30 while mobile device 30 is in the location, or substantially concurrently with the time that mobile device 30 is in the location.

The term "substantially concurrently," as used in this disclosure, means at the same time as a mobile device is in the location, or within a very short measure of time or distance from the location. For example, times may be considered to be "substantially concurrent" if they are within up to 30 seconds of each other, up to 1 minute of each other, or up to 2 or 3 minutes of each other, or some other short time limit. Locations may be considered to be "substantially concurrent" if the measured signal strengths from various beacons have not changed more than a threshold amount, such as by more than 5%, no more than 10%, no more than 20%, or another relatively small measure.

The system, when used to provide a categorical description of physical space, may serve as a foundation for a number of useful applications (personalized product recommendations, one-click access to actions other users take nearby, etc.). The disclosed examples do not require that floor maps be manually loaded. For instance, a retailer with 1000 stores may find it cumbersome to load and manage 1000 store maps in order to provide mobile experiences with physical context. This system may allow the retailer to generate store maps in real time.

The disclosed examples may automatically adapt to changing floor maps. For instance, in the disclosed examples, floor maps may automatically change to adapt to changes in the location of items or the addition of new items. For instance, a retail floor map changes from time-to-time for freshening the display of items, phasing out of old products, and introducing new products.

Many of the disclosed examples do not require that sensor physical location be known or constant. The sensors may be deployed around the store without their exact location being specified to speed deployment of the system. Sensor locations can also change and the system may "self-heal" and still operate properly. However, as noted below, in some examples, physical location information may be used to transform a signal space floor map into a human readable floor map.

In order to provide contextual and relevant content to users of mobile devices in real-time as they traverse physical space 10, the system may generate a function, F, mapping physical location in three dimensions or N dimensions in signal space to a rank ordered list of relevant content in physical space 10. The present disclosure relates to the incorporation and aggregation of user interactions with mobile devices along with localized sensor data in order to learn the function, F. The methods and systems described in this disclosure may be used in fields such as retail (for use in combination with personal preference and business rules to provide product, offer, and content recommendations to shoppers in real-time as they browse a physical retail store), building construction (to present relevant drawings, work orders, tasks, issues, and other pieces of content in the construction or remodeling of buildings), and other fields.

The system may be set up by initially placing a network of proximity sensor beacons 11 around physical space 10. In some examples, the placement need not be exactly uniform, but substantially uniform placement may increase robustness of the system.

In one example, the system uses radio-based sensors running the Bluetooth Low Energy (BLE) protocol. In other examples, other short range communication protocols are used. For example, the system may use any communication protocol, including but not limited to, WiFi—(i.e., an IEEE 802.11 protocol), sonic-, and photo-based systems. Each of beacons 11 may transmit a universally unique identifier (UUID) at constant power, called a "beacon_id" hereafter. Over time, various mobile devices may receive the beacon_id and a signal strength power measurement. The power level may be inversely proportional to the distance from the mobile device (e.g., sensor) to the beacon.

In some examples, the system is multi-tenant and comprises tenant and server components. In such examples, a tenant component includes a software application (i.e., a tenant application) running on one or more mobile devices. The tenant application has access to data gathered by sensors of mobile device 30 so that the beacon network can be detected. The tenant application may direct mobile device 30 to transmit detected data to server 50. Optionally, the tenant application also may include functions that enable a user of mobile device 30 to view information about various products that are located in the area of beacons 11. For example, the tenant application may include a retailer's product catalog application, a conference manager's attendee information application, or another application offered by or otherwise associated with an operator of physical space 10 where beacons 11 are placed. In some examples, the tenant application may have the capability of receiving data from other applications installed in mobile device 30, such as Uniform Resource Locators (URLs) or other identifiers associated with content that a Web browser application of mobile device 30 accesses.

The server component is a software application running on a computing device or group of computing devices, such as server 50, accessible via the Internet or another multi-party communication network. This application may store at least the most recent locations of some or all mobile devices, as well as data relating to the content viewed by those mobile devices, and may use the location and content data to learn the floor map. Server 50 also may use mobile device locations to fetch contextually relevant content, and send content directly to the mobile devices or, alternatively, send content to third party software applications (e.g. advertisement delivery networks) that eventually send relevant content to mobile devices.

The system may operate in one of at least two modes. A first mode, referred to as a "discrete" mode, uses the closest beacon or beacons to a mobile device to develop a floor map. When operating in the "discrete" mode, the system may be referred to as a "discrete" system. A second mode, referred to as a "continuous" mode, creates a multi-dimensional model. Examples of each will be described below. When operating in the "continuous" mode, the system may be referred to as a "continuous" system.

Figure 2:
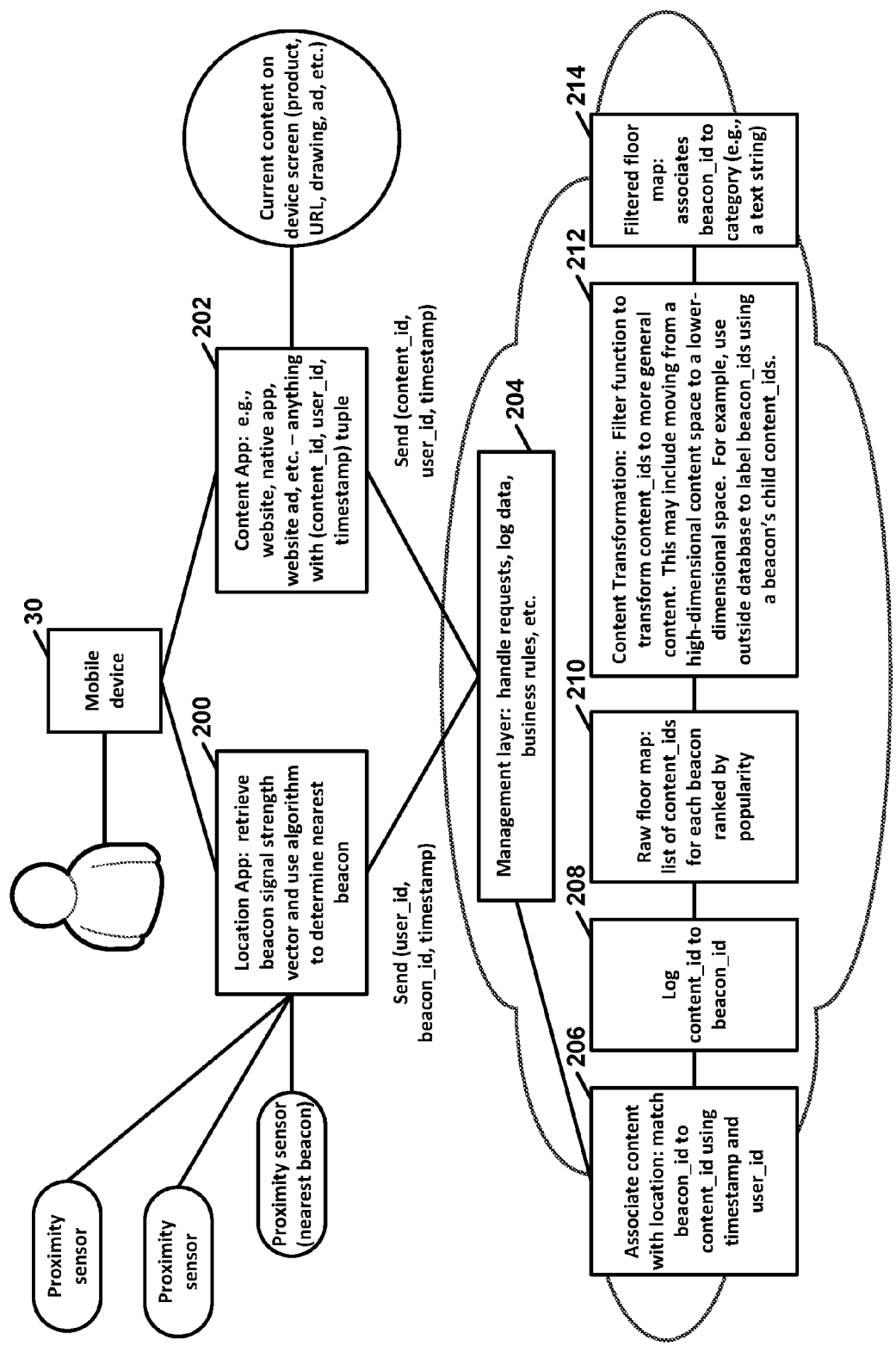
FIG. 2 is an illustration of various elements of a discrete floor map learning process, in accordance with a technique of this disclosure.

FIG. 2 is an illustration of various elements of a discrete floor map learning process, in accordance with a technique of this disclosure. In the "discrete" mode, mobile devices, such as mobile device 30, listen to a beacon network, such as the network of beacons 11. At multiple points (e.g., some or all points) in physical space 10, mobile device 30 detects a vector of (beacon_id, power) tuples from the beacon network. By running the tenant application, mobile device 30 may identify the nearest beacon as the one with the highest detected signal strength. As a user walks around physical space 10 with mobile device 30, the nearest beacon is updated on a set time interval. The user or mobile device 30 may also be identified using a separate UUID identifier (in this disclosure referred to as "user_id"). In this example, each time mobile device 30 updates the nearest beacon, the tenant application of mobile device 30 sends the tuple (beacon_id, user_id, timestamp) to server 50.

Users may use mobile devices in indoor spaces to access (e.g., view) many types of digital content, such as webpages, PDFs, coupons, advertisements, and the like. Each time a user uses a mobile device, such as mobile device 30, to access a piece of content, the tenant (e.g., an application executing on mobile device 30) may send a content identifier (e.g., URL, product_id, etc.), referred to as a "content_id" hereafter, to server 50 in the form of a (user_id, content_id, timestamp) tuple. Server 50 may match this content identifier to a most recent location check-in to generate a (beacon_id, content_id) tuple saved by server 50. This logs content at the appropriate physical location. In some examples, if a timestamp of the most recent location check-in was before a particular threshold time, such as more than a particular time unit old, server 50 does not match the content to the location.

In some examples, server 50 tracks of locations of mobile devices at multiple (e.g., all) times while the mobile devices are in physical space 10. This may occur in real time based on real-time communications between server 50 and the mobile devices, or on a periodic basis such as when transmissions are periodically pushed or polled between server 50 and the mobile devices. Server 50 also may separately keep track of content viewed on the mobile devices, matching the two at server 50. A reason for this is so that only one tenant application (referred to herein as a "Location App") may be required to track a location of mobile device 30 rather than every content delivery application (referred to herein as a "Content App") on mobile device 30 also needing to track the location of mobile device 30. In the example of FIG. 2, location app 200 and content app 202 are shown separate from mobile device 30 for conceptual reasons, but actually execute at mobile device 30. It may also allow graceful handling of cases in which mobile device 30 intermittently loses its connection to the location network.

Furthermore, on certain mobile device operating systems, only certain applications may have access to the operating system (OS) support for sensing a location network. For instance, a native application may have access to the location services, but a web application running on a mobile browser may not. In such a case, the system runs in the background on a native application and is able to connect mobile device content with location on the server side no matter how the user interacts with that content (e.g., native app, web browser, advertisement, etc.). For example, while the native application runs in the background, content viewed on a website or clicks on web-based advertisements can be linked with location.

Thus, in the example of FIG. 2, location app 200 of mobile device 30 may determine a beacon strength vector (i.e., a sensor signal strength) and use an algorithm to determine a nearest beacon. Furthermore, location app 200 may send, to a management layer 204 of server 50, a (user_id, beacon_id, timestamp) tuple. Additionally, content app 202 of mobile device 30 (e.g., a website, native app, website ad, etc.) may send a (content_id, timestamp) tuple to management layer 204.

The set of allowed beacon_ids corresponding to the tenant application (e.g., location app 200) are saved on mobile device 30. When a user of mobile device 30 with the tenant application installed nears an area having a network with beacons 11 whose beacon_ids match the allowed beacon_ids, the tenant application begins running in the background, determining ranges of beacons 11. Some operating systems require that a user of mobile device 30 give permission for the tenant application to begin running and periodically permit the tenant application to continue running in the background. An allowed beacon_id may be one having, for example, a known group identifier portion.

After a period of time, server 50 may accumulate a large number of (beacon_id, content_id) tuples across a large number of unique users and multiple visits to physical space 10. Server 50 may transform the log of tuples into a vector of a number of pieces of content associated with each beacon sensor, with each piece of content having a relevance score proportional to the number of times the (beacon_id, content_id) tuple occurs. The transformation function mapping (beacon_id, content_id) instances to scored content may be as simple as a statistical average, which assigns weights to each instance uniformly, though it may be a more complex function, such as a time-dependent one in which the instance weights are dependent on the time since observation of the instance. Such a windowed function may enable the system to adapt over time to changes in the content viewed in the indoor space, resulting from changes in room layout or changes in room contents, such as a retailer changing the layout of products in a store, discontinuing some products, or introducing new products. Server 50 may also apply a filtering function such that the relevance score of an individual piece of content is a function of some set of dependent variables, such as time-of-day, day-of-week, etc. After server 50 relates the scored list of content_ids to each of the beacons, the list can be fetched by the tenant application for mobile device 30 near a given sensor, as detailed in a later section of this disclosure. This floor map may allow mobile devices to retrieve a list of content that other users looked at near a given location.

Outside databases may be used to further filter, refine, and transform the learned floor map. For example a dictionary data structure mapping content_id to metadata (such as category id) exists in the form {content_id:category id}. Typically the metadata such as category id lies in a lower dimensional space that is human interpretable (e.g. URLs of product pages are mapped to the category of the product: {'http:www.url123.com/mensjeans': 'Mens Jeans'}. For an example retail application, this dictionary may take the form of a table such as that shown below:

TABLE 1

Mapping content_id to a lower dimensional space using a database

| content_id | category_id |
|---|---|
| http:www.url123.com/mensjeans?productId=0113_2974_919&catId=cat20066 | men's jeans |
| http:www. url123 .com/womensjeans?productId?productId=1340_6373_300 | women's sweaters |
| http:www.url123.com/womenssweaters?productId?productId=0344_6446_021 | women's sweaters |

A filter function may be used to classify each sensor as corresponding to a set of metadata. This may result in a simpler floor map relating to metadata rather than content_ids.

In this disclosure, such a floor map may be referred to as a "Filtered Floor map." This data structure can be used for directing categorical targeted advertisements to the user of mobile device 30. For retail applications for example, the system can direct ads for jeans to people who are in the jeans section of the retail space, as shown in Table 2:

TABLE 2

Learned Transformed Discrete Floor map: "Filtered Floor map"

| beacon_id | category_id |
|---|---|
| 94328407-B512-4284-872D-FC18DF01B95D_1_1 | men's jeans |
| 94328407-B512-4284-872D-FC18DF01B95D_1_2 | women's sweaters |
| 94328407-B512-4284-872D-FC18DF01B95D_1_3 | men's sweaters |

Thus, in the example of FIG. 2, server 50 may associate (206) content accessed by mobile device 30 with locations within physical space 10. For instance, server 50 may match beacon_ids to content_id using the timestamp and user_id elements of tuples received by server 50. Furthermore, server 50 may log (208) the content_id to beacon_id mappings. Server 50 may generate (210) a raw floor map. The raw floor map may comprise a list of content_ids for each beacon, ranked by popularity. For instance, server 50 ranks a respective (content_id, beacon_id) pair based on the number of times the respective (content_id, beacon_id) occurs. Furthermore, server 50 may apply (212) a content transformation. The content transformation may comprise a filter function to transform content_ids to more general content. This may include moving from a high-dimensional content space to a lower-dimensional content space. For example, server 50 may use an outside database to label beacon_ids using a beacon's child content_ids. In addition, server 50 may generate (214) a filtered floor map that associates beacon_ids to categories, e.g., such as text strings.

Figure 3:
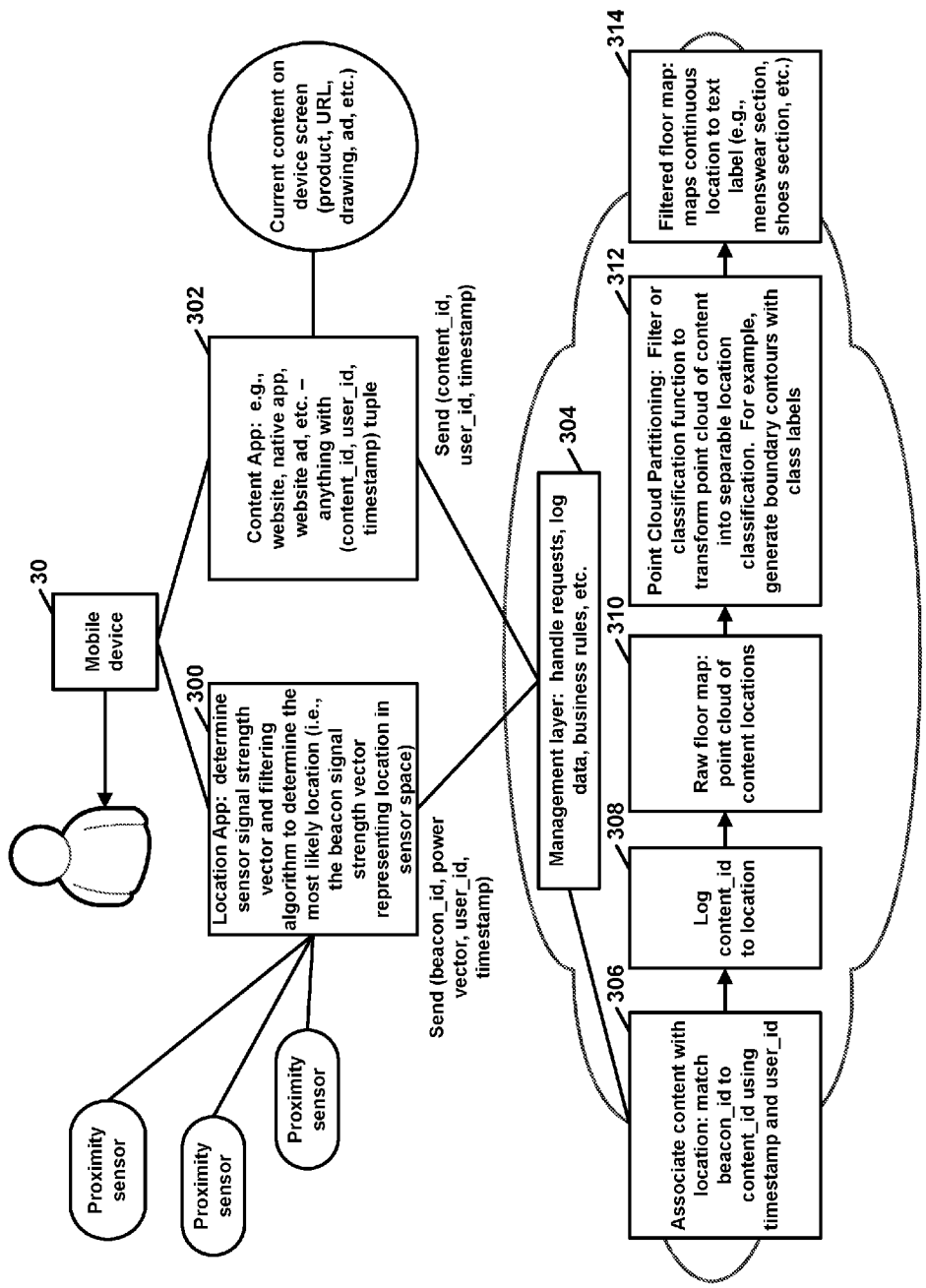
FIG. 3 is an illustration of various elements of a continuous floor map learning process, in accordance with a technique of this disclosure.

FIG. 3 is an illustration of various elements of the continuous floor map learning process, in accordance with a technique of this disclosure. Up to this point in this disclosure, the system described uses beacons 11 as discrete containers for relevant content. In an example, the system creates a point cloud of content in the continuous sensor-space. A "sensor-space" is a model representing a physical space with dimension N, where N is the number of beacons within the physical space. Each of the N sensors can generate a power output (i.e., a signal of a maximum strength), which is a real number. The N dimensions of signal space are non-orthogonal in comparison to the 3-dimensional vector representing Euclidean space.) The operation may be considered similar in many regards to the Discrete Mode described above, with a few key differences. These differences arise out of the use of the beacons to form a continuous location network. Instead of mobile devices using their nearest beacons, a mobile device may use the detected signals from multiple proximal beacons along with a filter to reconstruct the beacon signal strength vector, which essentially "locates" mobile device 30 in so-called sensor-space. The continuous form of the system may allow for a greater resolution of relevant content recommendations: each point in three-dimensional space (represented in N dimensional signal-space) has its own, possibly unique, set of content associated with it. Thus, the granularity of the system approaches the limit of the resolution of the location network, which may be infinite in a true continuous location network, rather than being constrained to N states as in the "discrete" mode of the system.

The continuous system architecture and operation may be similar to the "discrete" mode of the system, except in the ways such as those described below. For instance, a mobile device may determine a vector of signal strengths from any of beacons 11 within range. Mobile device 30 may give any of beacons 11 out of range a signal strength of zero. Mobile device 30 may use a filter to filter out some of the noise fluctuations in the signal vector. Mobile device 30 may send the signal vector to server 50 along with the user_id, rather than only sending the beacon_id with strongest signal. This vector represents the device location in signal-space. Mobile device 30 may transmit mobile device content to server 50 similarly to the discrete system. Server 50 may match the content to the most recent signal-space location, if the time since last location log has not exceeded an adjustable threshold. This system may result in a large point-cloud of (content_id, [beacon_id, beacon_id, . . . ]) tuples across signal-space, which represents the learned floor map, which represents a learned floor map, where "beacon_id" identifies a beacon and a detected strength of a signal of the beacon.

A filter or transformation function can be passed over the point cloud to reduce the data from high-dimensional content-space to a lower dimensional categorical-space representation, which is often more convenient for later use. The operation is similar in purpose to the "discrete" mode of the system, but implementation differs. The transformation is implemented by applying a convolution integral over sensor-space. For instance, in the case of retail products, assume a convolution function can be applied to each piece of content: the function maps content_id to category_id (men's clothes, women's clothes, shoes, personal health items, etc.).

Perform a discrete integral over the point-cloud of content_ids in sensor-space in convolution with a spherical filter function mimicking the statistical mode operator (e.g., (i) take the argmax over all content_ids within a specified radius in signal-space of the number of occurrences of a given content_id; and (ii) Transform the content_id to category_id using a metadata database). The resulting function maps sensor-space to product category, essentially yielding a function that returns a product category for any point in signal-space. In other examples, a classification algorithm may be used to partition the space optimally.

In these ways, the system can create a floor map of physical space 10 by receiving beacon and content from mobile devices that move throughout physical space 10. The mobile devices detect beacon identifiers transmitted from beacons 11 and determine a signal strength for each detected unique beacon identifier. Substantially concurrently with the detecting, an application of mobile device 30 is used to access content that corresponds to one or more items that are present in the physical space. The application may be, for example, a web browser, a native application, a barcode scanning application, a camera application, and the like. The mobile device 30 may send the detected signal strengths, unique beacon identifiers, and an identifier for the accessed content to server 50 for use in building a content-based map of the physical space. Optionally, the application may transform one or more if these items to a vector representation before sending the data. The system may repeat the detecting, determining, identifying and sending after mobile device 30 as moved to a different location in the physical space. Eventually, after a period of time, the system may update the floor map by using newly-received vector data and discarding older vector data. The system may use any suitable threshold or criteria for distinguishing newer data from other data.

In the example of FIG. 3, a location app 300 and a content app 302 execute on mobile device 30. Location app 300 may determine a sensor signal strength vector and may apply a filtering algorithm to determine a most likely location of mobile device 30 (i.e., the beacon signal strength vector representing a location in a sensor space). Furthermore, location app 300 may send a (beacon_id, power vector, user_id, timestamp) tuple to management layer 304 of server 50. The power vector element (i.e., a signal vector) of the tuple may indicate signal strengths of beacons. The user_id element of the tuple may identify a user of mobile device 30. The timestamp element of the tuple may indicate a time associated with the power vector. Management layer 304 may handle requests, log data, apply business rules, and so on. Additionally, in the example of FIG. 3, content app 302 may send a (content_id, user_id, timestamp) tuple to management layer 304. The content_id element of the tuple may include an identifier of content accessed by content app 302. The user_id element of the tuple may identify a user of mobile device 30. The timestamp element of the tuple may indicate a time at which content app 302 accessed the content.

Furthermore, in the example of FIG. 3, server 50 may associate (306) content with locations. For instance, server 50 may match beacon_ids to content_ids using timestamps and user_ids. In other words, server 50 may generate (content_id, beacon_id) pairs. Furthermore, server 50 may log data mapping content_ids to locations (308). Additionally, server 50 may generate a raw floor map (310). The raw floor map may include a point cloud of content locations. Additionally, server 50 may perform point cloud partitioning (312). For instance, server 50 may apply a filter or classification function to transform the point cloud of content into separable location classification. For example, server 50 may generate boundary contours with class labels. Furthermore, server 50 may generate a filtered floor map (314). The filtered floor map may map continuous locations to text labels, such as menswear, shoes, and so on.

Figure 4:
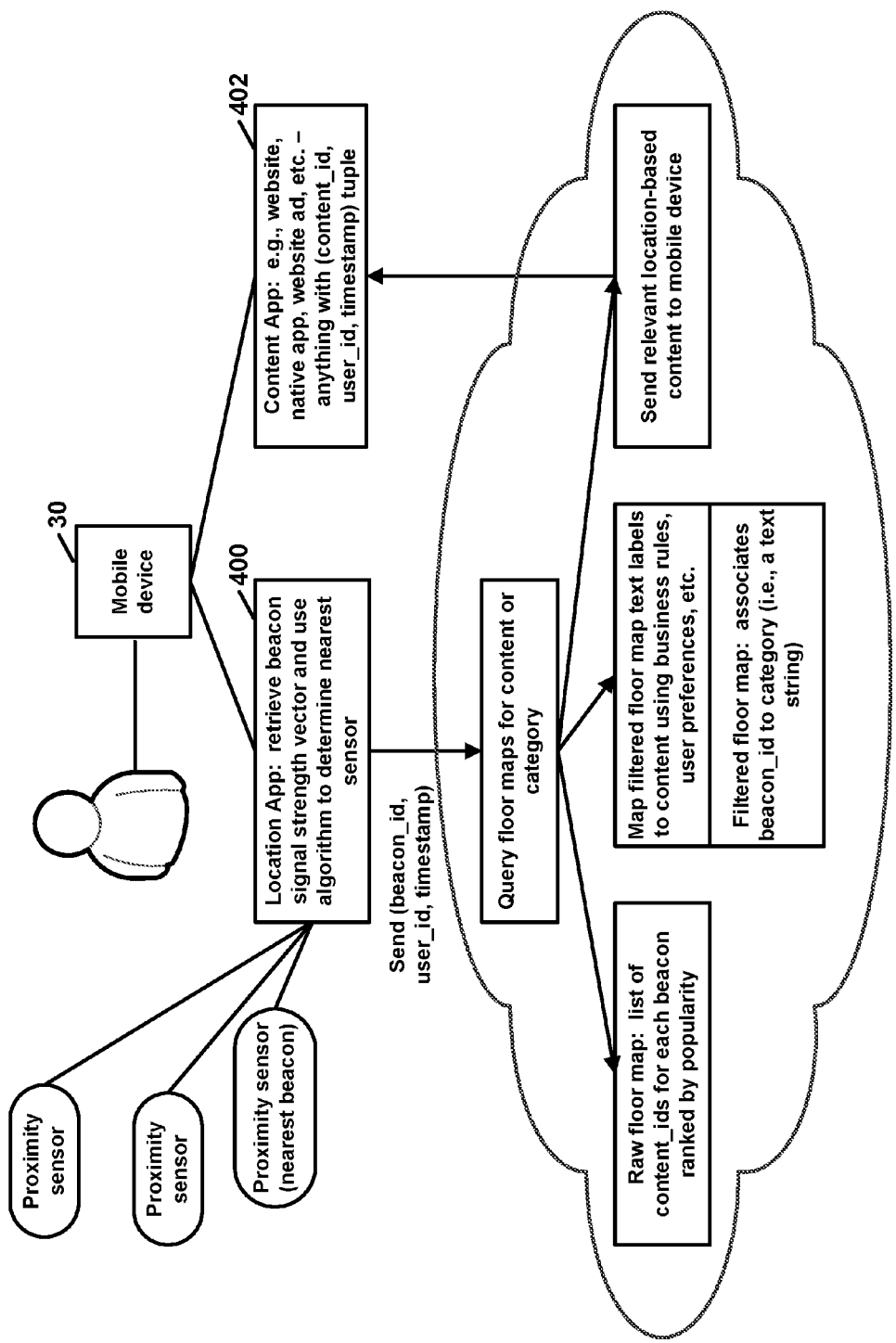
FIG. 4 illustrates a method of querying a floor map in a discrete system, in accordance with a technique of this disclosure.
Figure 5:
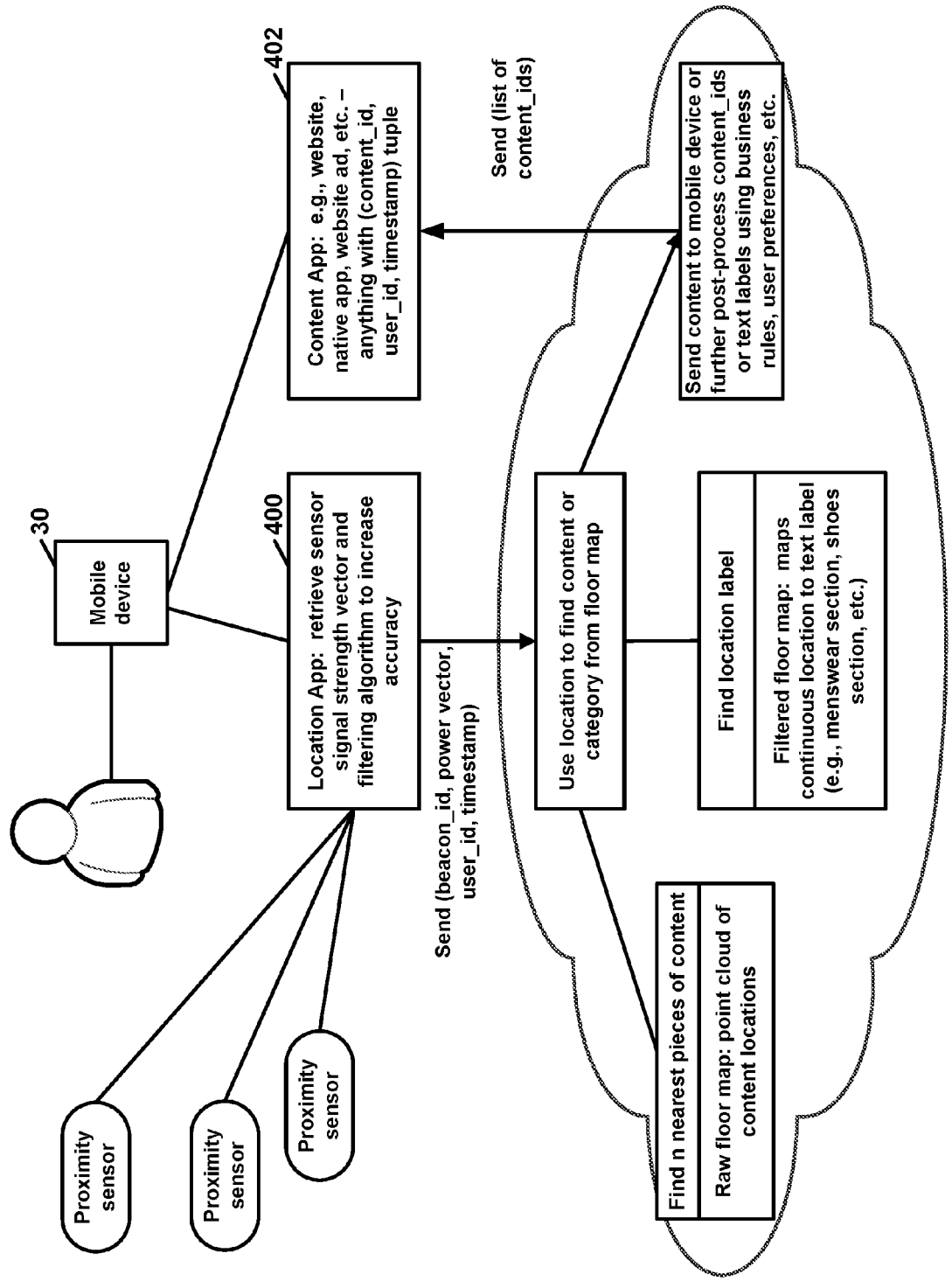
FIG. 5 illustrates a method of querying a floor map in a continuous system, in accordance with a technique of this disclosure.

FIG. 4 illustrates a method of querying a floor map in a discrete system, in accordance with a technique of this disclosure. FIG. 5 illustrates a method of querying a floor map in a continuous system, in accordance with a technique of this disclosure. Thus far, this disclosure has described a system and process for learning a floor map. In some examples, the system may also be used to query the floor map. For this disclosure, assume that a tenant mobile device (e.g., mobile device 30) is running at least the following two applications (or one application that performs the following two functions):

Location App 400: measures beacon signal strength and transmits the measured beacon signal strength to a server, such a server 50 (FIG. 1). For instance, location app 400 may send (beacon_id, user_id, timestamp) tuples to server 50.

Content App 402: displays content dependent on a location of mobile device 30 and retrieved from server 50 or another source.

In some examples, these two applications are packaged into a single application. For example, in case of a retailer, Location App 400 may be a retailer's native shopping application. In this example, Content App 402 may include the retailer's website as shown on a web browser of mobile device 30, third-party advertisements shown on a website not owned by the retailer, or the retailer's native app (i.e. the native app would serve as both Location App 400 and Content App 402).

To query a floor map in a discrete system, as illustrated in FIG. 4, Location App 400 may measure beacon signal strength, determine the closest beacon by identifying which detected beacon_id is associated with the highest signal strength, and send this data to server 50. Server 50 uses the beacon_id to fetch a list of content from the raw floor map (content other devices have displayed near this beacon) or by using the filtered floor map to fetch metadata such as category_id. Server 50 may transform the metadata into a list of content using a combination of an outside database and business rules. For instance, given a product category, a web crawl indexing a retailer website may be used to generate a database of products for each product category. The system uses beacon_id to fetch category id and category id to fetch a set of relevant products in the form of content_ids. Server 50 sends the list of content items back to mobile device 30. Server 50 may perform some transformation operation on the content items (e.g., combine with user preferences to filter or score content) before sending back to Content App 402 on mobile device 30 for display.

To query a floor map in a continuous system, as illustrated in FIG. 5, the querying process may operate in a manner similar to the discrete system with at least the following differences. Location App 400 on mobile device 30 sends the signal strength vector to server 50. Filtering may be performed before (on mobile device 30) or after (server 50). Server 50 fetches data either from the raw floor map, filtered floor map, or both. In the case of the raw floor map, server 50 fetches a set of nearest logged pieces of content from the floor map. The list of content_ids are de-duplicated and ranked by number of occurrences in the original set. In the case of the filtered floor map, server 50 fetches the category label using the signal strength vector. The remainder of the systems operates identically to the "discrete" mode of the system. After the floor map has been learned, server 50 may execute programming instructions including one or more business rule systems that determine when, whether and/or how to deliver targeted messaging and content to mobile devices based on category label (category_id). For instance, in retail applications, the filtered floor map uses product category labels to partition the signal-space (continuous) or label the beacons (discrete). Server 50 or another device may maintain a database of targeted messages (special offers, coupons, web URIs, etc.) mapping product category to content (see Table 3 below). Server 50 may transmit this content to the determined appropriate mobile devices at a determined appropriate time in its course of service. This system can also be joined with other business rules (time-in-store, shopper age, etc.) to further refine content delivery. Thus, a location-based targeted marketing platform is facilitated.

TABLE 3

Database for targeting content to mobile devices based on category_id.

| category_id | content to send |
| --- | --- |
| men's jeans | 10% off jeans offer |
| women's sweaters | Have you seen our jeans? advertisement |
| men's sweaters | Here's a sneak peek at next season's sweaters |

In some examples, server 50 may also maintain or have access to a data storage facility with a database associating location information with the beacon_ids. If so, when the system collects the information from the beacons via mobile devices, the system may use this information to create a human-readable floor map. Server 50 may then associate the location data with content viewed on mobile device 30 to add product location data to the human-readable floor map. The system may save this information in one or more data files and present the data to a user, such as a user of mobile device 30 using a tenant application or a content application.

Figure 6:
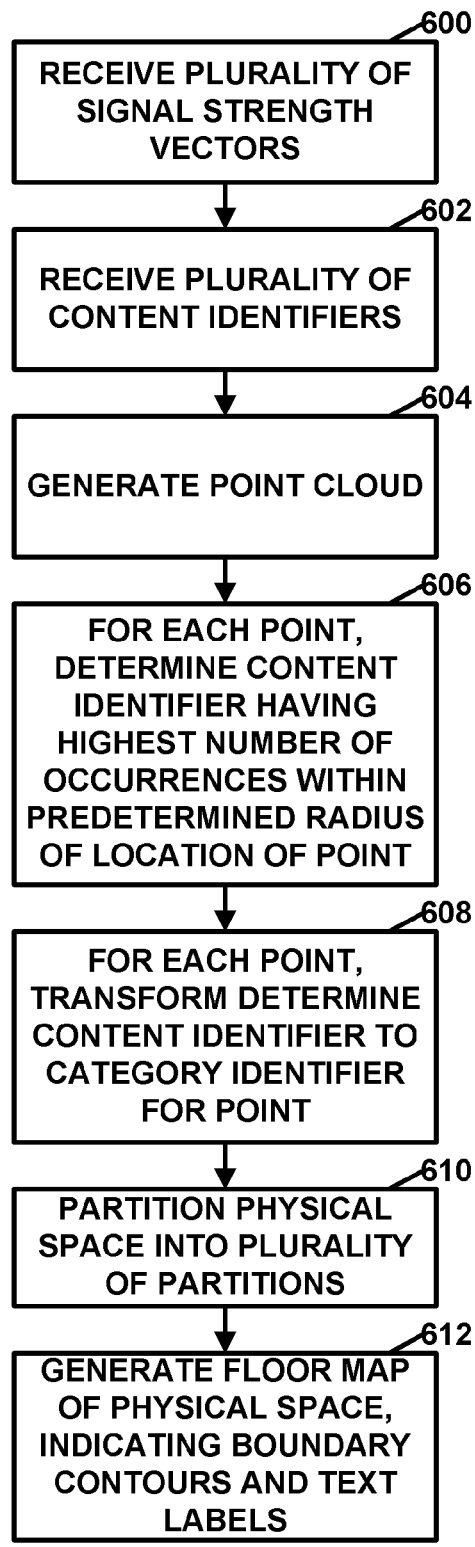
FIG. 6 is a flowchart illustrating an example operation of a computing system, in accordance with a technique of this disclosure.

FIG. 6 is a flowchart illustrating an example operation of a computing system, in accordance with a technique of this disclosure. The operation of FIG. 6 is merely one example. Other examples may include more, fewer, or different actions. Furthermore, other examples may include the actions in different orders or in parallel. The example operation of FIG. 6 may be performed by server 50 or another computing device. The computing system may comprise one or more computing devices.

In the example of FIG. 6, a computing system receives (600) a plurality of signal strength vectors. Each respective signal strength vector of the plurality of signal strength vectors comprises respective indications of signal strengths, as detected by a mobile device (e.g., mobile device 30) of a plurality of mobile devices, of signals emitted by a plurality of beacons (e.g., beacons 11) located within a physical space (e.g., physical space 10). Additionally, the computing system receives (602) a plurality of content identifiers. Each respective content identifier of the plurality of content identifiers may identify content accessed by a mobile device (e.g., mobile device 30) of the plurality of mobile devices. The content may correspond to (e.g., describe) an item among a plurality of items located within the physical space.

In some examples, the computing system may receive a particular signal strength vector of the plurality of signal strength vectors from an application associated with an operator of the physical space. Furthermore, in some examples, the computing system may receive a particular content identifier of the plurality of content identifiers from a browsing application accessing a website associated with an operator of the physical space. The particular content identifier may comprise an identifier for a page of the website accessed by the browsing application.

Furthermore, the computing system may generate (604) a point cloud comprising a plurality of points. Each respective point of the point cloud may map a respective content identifier of the plurality of content identifiers to a respective location within the physical space corresponding to a respective signal strength vector of the plurality of signal strength vectors. In some examples, the computing system may update the floor map by discarding signal strength vectors older than a particular age.

In some examples, for each respective signal strength vector of the plurality of signal strength vectors, the computing system receives a respective user identifier for the respective signal strength vector identifying a user of a mobile device that detected the signal strengths of the respective signal strength vector. Furthermore, for each respective signal strength vector of the plurality of signal strength vectors, the computing system may receive a respective timestamp for the respective signal strength vector. In such examples, for each respective content identifier of the plurality of content identifiers, the computing system receives a respective user identifier for the respective content identifier identifying a user of the mobile device that accessed the content_identified by the respective content identifier. Furthermore, for each respective content identifier of the plurality of content identifiers, the computing system receives a respective timestamp for the respective content identifier. In such examples, as part of generating the point cloud, the computing system matches, based on the timestamps and user identifiers for the signal strength vectors and the timestamps and user identifiers of the content identifiers, particular content identifiers of the plurality of content identifiers to particular signal strength vectors of the plurality of signal strength vectors.

For each respective point of the point cloud, the computing system may determine (606) a content identifier having a highest number of occurrences within a predetermined radius of the location of the respective point. The determined content identifier is among the plurality of content identifiers. Additionally, for each respective point of the point cloud, the computing system may transform (608) the determined content identifier to a category identifier for the location of the respective point. The category identifier may identify a category of items in the plurality of items. The computing system may partition (610) the physical space into a plurality of partitions. Each respective partition of the plurality of partitions may correspond to a respective contiguous area within the physical space having a respective shared category identifier. Additionally, the computing system may generate (612) a floor map of the physical space. The floor map may include boundary contours of the partitions and may include, for each respective partition of the plurality of partitions, a respective text label indicating a respective category of items identified by the respective shared category identifier of the respective contiguous area to which the respective partition corresponds.

Figure 7:
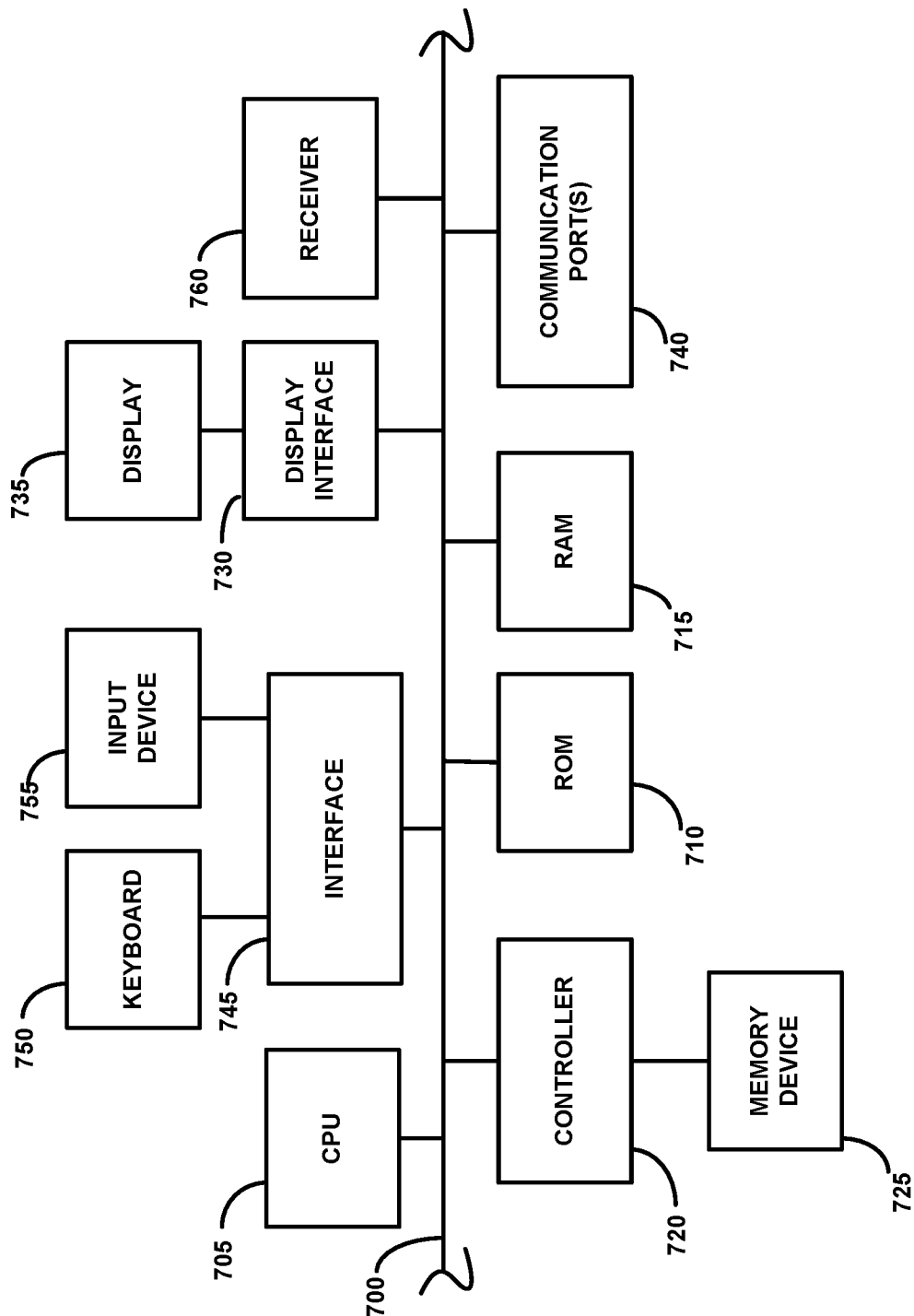
FIG. 7 illustrates an example of various components of an electronic device, such as a mobile device or a computing device that provides a function of a server.

FIG. 7 is a block diagram illustrating various elements of an electronic device, such as a mobile device (e.g., mobile device 30) or a computing device that performs the functions of a server (e.g., server 50). In the example of FIG. 7, an electrical bus 700 serves as an information highway interconnecting the other illustrated components of the hardware. CPU 705 is a central processing unit of the system, performing calculations and logic operations required to execute a program. CPU 705, alone or in conjunction with one or more of the other elements disclosed in FIG. 7, is a processing device, computing device or processor as such terms are used within this disclosure. Read only memory (ROM) 710 and random access memory (RAM) 715 constitute examples of memory devices.

A controller 720 interfaces with one or more optional memory devices 725 serving as data storage facilities to system bus 700. Memory devices 725 may include, for example, an external DVD drive or CD ROM drive, a hard drive, flash memory, a USB drive or another type of device serving as a data storage facility. As indicated previously, these various drives and controllers are optional devices. Additionally, memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in ROM 710 and/or RAM 715. Optionally, the program instructions may be stored on a tangible, non-transitory computer readable medium such as a compact disk, a digital disk, flash memory, a memory card, a USB drive, an optical disc storage medium, a distributed computer storage platform such as a cloud-based architecture, and/or other recording medium.

When used in this disclosure, the term "processor" can refer to a single processor or to multiple processors that together implement various steps of a process. Similarly, a "memory device" or "database" can refer to a single device or databases or multiple devices or databases across which programming instructions and/or data are distributed.

A display interface 730 may permit information from bus 700 to be displayed on display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device. The hardware also may include one or more short range transmission detection devices 760, such as an Bluetooth receiver.

Figure 8:
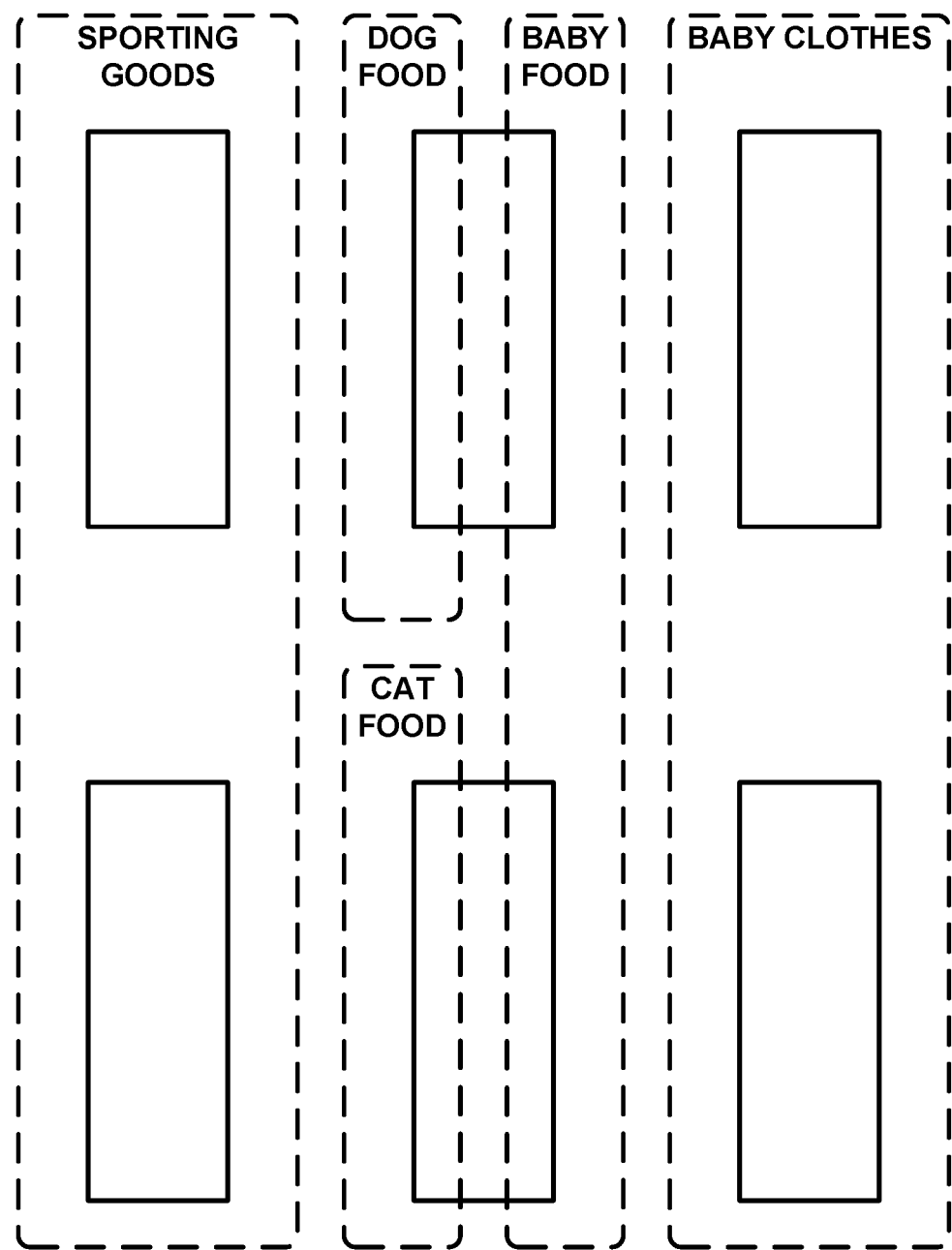
FIG. 8 is a conceptual diagram illustrating an example floor map generated in accordance with a technique of this disclosure.

FIG. 8 is a conceptual diagram illustrating an example floor map generated in accordance with a technique of this disclosure. In the example of FIG. 8, solid lined boxes correspond to display racks in a retail space. The dashed boxes indicate boundary contours of partitions corresponding to different categories of items. In the example of FIG. 8, the categories are "sporting goods," "dog food," "cat food," "baby food," and "baby clothes."

The following paragraphs describe examples of this disclosure.

EXAMPLE 1

A system for content-based mapping of a physical space, comprising: a set of beacons positioned at various locations in a physical space, wherein each beacon includes a transmitter that transmits a unique beacon identifier; one or more software applications installed on a mobile electronic device, wherein the one or more software applications comprise programming instructions that, when executed, cause the mobile electronic device to perform information collection functions, the information collection functions comprising: detecting one or more unique beacon identifiers transmitted from one or more of the beacons; determine a signal strength for each detected unique beacon identifier; identifying that, substantially concurrently with the detecting, an application of the mobile device is being used to access content that corresponds to one or more items that are present in the physical space; sending the detected signal strengths, unique beacon identifiers, and an identifier for the accessed content to a server for use in building a content-based map of the physical space; and repeating the detecting, determining, identifying and sending after the mobile electronic device has moved to a different location in the physical space.

EXAMPLE 2

The system of example 1, further comprising the server, wherein the server contains programming instructions that cause the server to: receive the detected signal strengths, unique beacon identifiers, and identifiers for the accessed content; use the received data to create a floor map of the physical space by mapping a signal space representation of the physical space to items located in the physical space.

EXAMPLE 3

The system of example 1, wherein the instructions to identify that the mobile electronic device is being used to access content that corresponds to one or more products that are present in the physical space comprise instructions to: determine that the mobile device is running an application that is associated with an operator of the physical space; receive, from the application, a product identifier that relates to a product that was being presented by the application substantially concurrently with the detecting, and retrieve a content identifier associated with the product identifier.

EXAMPLE 4

The system of example 1, wherein the instructions to identify that the mobile electronic device is being used to access content that corresponds to one or more products that are present in the physical space comprise instructions to: determine that the mobile device is using a browsing application to access a website that is associated with an operator of the physical space; receive, from the application, an identifier for a page of the website that was being presented by the application substantially concurrently with the detecting, and retrieve a content identifier associated with the page.

EXAMPLE 5

The system of example 1, wherein the instructions to identify that the mobile electronic device is being used to access content that corresponds to one or more products that are present in the physical space comprise instructions to: receive, from the application, a barcode captured by a barcode scanning application of the device, wherein the barcode is associated with a product that is available in the physical space, and retrieve a content identifier associated with the barcode.

EXAMPLE 6

The system of example 2, wherein: the instructions that cause each electronic device to send the detected signal strengths and unique beacon identifiers comprise instructions to send the beacon identifier for the beacon having the highest detected signal strength out of a plurality of detected signal strengths at a point in time; and the instructions that cause the server to create the floor map of the physical space comprise instructions to: transform a group of tuples, each tuple comprising a beacon identifier and associated content identifier, into one or more vectors; map the vectors to a signal space representation of the physical space; receive additional tuples and update the additional tuples to additional vectors; and create an updated signal space representation of the physical space using the additional vectors and without using one or more older vectors.

EXAMPLE 7

The system of example 6, wherein the instructions to map the vectors to a signal space representation of the physical space comprise instructions to: create a point cloud of content; receive additional tuples and update the additional tuples to additional vectors; and create an updated signal space representation of the physical space using the additional vectors and without using one or more older vectors.

EXAMPLE 8

The system of example 2, wherein: the instructions that cause each electronic device to send the detected signal strengths and unique beacon identifiers comprise instructions to detect a signal vector of signal strengths of any beacons within range at a point in time and send the signal vector to the server; and the instructions that cause the server to create the floor map of the physical space comprise instructions to map all received signal vectors to a signal space representation of the physical space.

EXAMPLE 9

The system of example 2, further comprising: associating each of the received unique beacon identifiers with a beacon location; and using the floor map and the beacon locations to create an electronic file that, when displayed on a display of a mobile device, will display as a human-readable floor map.

EXAMPLE 10

The system of example 1, wherein the mobile electronic device uses a low energy communication protocol to detect the beacon identifier.

EXAMPLE 11

The system of example 2, further comprising transforming the floor map by applying a filter to filter one or more categories of content from or into the floor map.

EXAMPLE 12

A system for content-based mapping of a physical space, comprising: a set of beacons positioned at various locations in a physical space, wherein each beacon includes a transmitter that uses a low energy protocol to transmits a unique beacon identifier; a server containing programming instructions that, when executed, cause the server to: receive, from one or more mobile electronic devices, data collected from within the physical space, wherein the data collected comprises: data representing one or more unique beacon identifiers transmitted by one or more of the beacons, data representing a signal strength associated with each detected unique beacon identifier, and information relating to content that corresponds to one or more products that are present in the physical space that were displayed on the mobile device when the mobile device detected the signal strength; and use the received data to develop a floor map of products located within the physical space.

EXAMPLE 13

The system of example 11, wherein for each beacon identifier, the beacon identifier and the data representing signal strength are received as a signal vector.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

The features and function described above, as well as alternatives, may be combined into many other different systems or applications. Various alternatives, modifications, variations or improvements may be made by those skilled in the art, each of which is also intended to be encompassed by the disclosed examples.

The invention claimed is:

1. A method of generating a floor map, the method comprising:
receiving, by a computing system comprising one or more computing devices, a first plurality of tuples from a plurality of mobile devices,
wherein each respective tuple of the first plurality of tuples comprises a beacon identifier of a beacon closest to a mobile device of the plurality of mobile devices, a user identifier of a user of the mobile device, and a timestamp, the beacon closest to the mobile device being one of a plurality of beacons located within a physical space;
receiving, by the computing system, a second plurality of tuples from the plurality of mobile devices,
wherein each respective tuple of the second plurality of tuples comprises a content identifier, a user identifier, and a timestamp, each respective content identifier of each respective tuple of the second plurality of tuples identifying content accessed by a mobile device of the plurality of mobile devices, the content corresponding to an item among a plurality of items located within the physical space;
generating, by the computing system, based on the timestamps and the user identifiers in the first and second pluralities of tuples, a third plurality of tuples, each respective tuple of the third plurality of tuples comprising a beacon identifier of a tuple in the first plurality of tuples and a content identifier of a tuple in the second plurality of tuples; and
generating, by the computing system, a floor map that comprises, for each respective beacon of the plurality of beacons, a respective list of content identifiers specified in tuples of the third plurality of tuples that comprise the beacon identifier of the respective beacon, wherein the respective list is ranked by popularity of the content identifiers specified in tuples of the third plurality of tuples that comprise the beacon identifier of the respective beacon.

2. The method of claim 1, wherein the floor map is a first floor map and one or more tuples of the third plurality of tuples include a particular content identifier, the method further comprising:
transforming, by the computing system, the particular content identifier to a category identifier, the category identifier identifying a category of items in the plurality of items; and
generating, by the computing system, a second floor map of the physical space, the second floor map associating beacon identifiers with categories.

3. The method of claim 2, wherein the plurality of mobile devices includes a particular mobile device, the method further comprising:
storing, by the computing system, a table that associates a particular beacon with the category of items; and
directing, by the computing system, an advertisement related to the category of items to the particular mobile device based on the particular mobile device being closer to the particular beacon than any other beacon of the plurality of beacons.

4. The method of claim 1, wherein:
the plurality of mobile devices includes a particular mobile device,
receiving the first plurality of tuples comprises: receiving, by the computing system, a particular tuple in the first plurality of tuples from a first application operating on the particular mobile device, and
receiving the second plurality of tuples comprises: receiving, by the computing system, a particular tuple in the second plurality of tuples from a second, different application operating on the particular mobile device.

5. The method of claim 4, wherein the second application is a web browser application.

6. The method of claim 5, wherein receiving the plurality of content identifiers comprises:
receiving, by the computing system, a particular content identifier of the plurality of content identifiers from the web browser application accessing a website associated with an operator of the physical space, wherein the particular content identifier comprises an identifier for a page of the website accessed by the web browser application.

7. The method of claim 4, wherein, in response to the particular mobile device nearing an area having the plurality of beacons, the first application begins running in a background of the particular mobile device.

8. The method of claim 1, wherein generating the floor map comprises, for each respective beacon of the plurality of beacons, determining, by the computing system, based on time-dependent weights applied to the content identifiers specified in tuples of the third plurality of tuples that comprise the beacon identifier of the respective beacon, popularity of the content identifiers specified in tuples of the third plurality of tuples that comprise the beacon identifier of the respective beacon.

9. A computing system comprising:
one or more communication ports configured to:
receive a first plurality of tuples from a plurality of mobile devices,
wherein each respective tuple of the first plurality of tuples comprises a beacon identifier of a beacon closest to a mobile device of the plurality of mobile devices, a user identifier of a user of the mobile device, and a timestamp, the beacon closest to the mobile device being one of a plurality of beacons located within a physical space;
receive a second plurality of tuples from the plurality of mobile devices,
wherein each respective tuple of the second plurality of tuples comprises a content identifier, a user identifier, and a timestamp, each respective content identifier of each respective tuple of the second plurality of tuples identifying content accessed by a mobile device of the plurality of mobile devices, the content corresponding to an item among a plurality of items located within the physical space; and
one or more processors configured to:
generate, based on the timestamps and the user identifiers in the first and second pluralities of tuples, a third plurality of tuples, each respective tuple of the third plurality of tuples comprising a beacon identifier of a tuple in the first plurality of tuples and a content identifier of a tuple in the second plurality of tuples; and
generate a floor map that comprises, for each respective beacon of the plurality of beacons, a respective list of content identifiers specified in tuples of the third plurality of tuples that comprise the beacon identifier of the respective beacon, wherein the respective list is ranked by popularity of the content identifiers specified in tuples of the third plurality of tuples that comprise the beacon identifier of the respective beacon.

10. The computing system of claim 9, wherein the floor map is a first floor map and one or more tuples of the third plurality of tuples include a particular content identifier, the one or more processors are configured to:
transform the particular content identifier to a category identifier, the category identifier identifying a category of items in the plurality of items; and
generate a second floor map of the physical space, the second floor map associating beacon identifiers with categories.

11. The computing system of claim 10, wherein the plurality of mobile devices includes a particular mobile device and the one or more processors are configured to:
store a table that associates a particular beacon with the category of items; and
direct an advertisement related to the category of items to the particular mobile device based on the particular mobile device being closer to the particular beacon than any other beacon of the plurality of beacons.

12. The computing system of claim 9, wherein:
the plurality of mobile devices includes a particular mobile device,
the one or more communication ports are configured to receive a particular tuple in the first plurality of tuples from a first application operating on the particular mobile device, and
the one or more communication ports are configured to receive a particular tuple in the second plurality of tuples from a second, different application operating on the particular mobile device.

13. The computing system of claim 12, wherein the second application is a web browser application.

14. The computing system of claim 13, wherein the one or more communication ports are configured to:
receive a particular content identifier of the plurality of content identifiers from the web browser application accessing a website associated with an operator of the physical space, wherein the particular content identifier comprises an identifier for a page of the website accessed by the web browser application.

15. The computing system of claim 9, wherein the one or more processors are configured such that, as part of generating the floor map, the one or more processors, for each respective beacon of the plurality of beacons, determine, based on time-dependent weights applied to the content identifiers specified in tuples of the third plurality of tuples that comprise the beacon identifier of the respective beacon, popularity of the content identifiers specified in tuples of the third plurality of tuples that comprise the beacon identifier of the respective beacon.

16. A non-transitory computer readable storage medium comprising instructions stored thereon that, when executed, configure a computing system to:
receive a first plurality of tuples from a plurality of mobile devices,
wherein each respective tuple of the first plurality of tuples comprises a beacon identifier of a beacon closest to a mobile device of the plurality of mobile devices, a user identifier of a user of the mobile device, and a timestamp, the beacon closest to the mobile device being one of a plurality of beacons located within a physical space;
receive a second plurality of tuples from the plurality of mobile devices,
wherein each respective tuple of the second plurality of tuples comprises a content identifier, a user identifier, and a timestamp, each respective content identifier of each respective tuple of the second plurality of tuples identifying content accessed by a mobile device of the plurality of mobile devices, the content corresponding to an item among a plurality of items located within the physical space; and
generate, based on the timestamps and the user identifiers in the first and second pluralities of tuples, a third plurality of tuples, each respective tuple of the third plurality of tuples comprising a beacon identifier of a tuple in the first plurality of tuples and a content identifier of a tuple in the second plurality of tuples; and
generate a floor map that comprises, for each respective beacon of the plurality of beacons, a respective list of content identifiers specified in tuples of the third plurality of tuples that comprise the beacon identifier of the respective beacon, wherein the respective list is ranked by popularity of the content identifiers specified in tuples of the third plurality of tuples that comprise the beacon identifier of the respective beacon.

17. The non-transitory computer readable storage medium of claim 16, wherein the floor map is a first floor map and one or more tuples of the third plurality of tuples include a particular content identifier, the instructions configuring the computing system to:
transform the particular content identifier to a category identifier, the category identifier identifying a category of items in the plurality of items; and
generate a second floor map of the physical space, the second floor map associating beacon identifiers with categories.

18. The non-transitory computer readable storage medium of claim 17, wherein:
the plurality of mobile devices includes a particular mobile device, and
the instructions configure the computing system to:
store a table that associates a particular beacon with the category of items; and
direct an advertisement related to the category of items to the particular mobile device based on the particular mobile device being closer to the particular beacon than any other beacon of the plurality of beacons.

19. The non-transitory computer readable storage medium of claim 16, wherein:
the plurality of mobile devices includes a particular mobile device, and
the instructions configure the computing system to:
receive a particular tuple in the first plurality of tuples from a first application operating on the particular mobile device, and
receive a particular tuple in the second plurality of tuples from a second, different application operating on the particular mobile device.

20. The non-transitory computer readable storage medium of claim 16, wherein the instructions configure the computing system such that, as part of generating the floor map, for each respective beacon of the plurality of beacons, the computing system determines, based on time-dependent weights applied to the content identifiers specified in tuples of the third plurality of tuples that comprise the beacon identifier of the respective beacon, popularity of the content identifiers specified in tuples of the third plurality of tuples that comprise the beacon identifier of the respective beacon.

* * * * *